United States Patent [19]
Ostrander et al.

[11] Patent Number: 5,984,378
[45] Date of Patent: Nov. 16, 1999

[54] INLINE QUICK CONNECTOR

[75] Inventors: James E. Ostrander, Rochester; Richard Pender, Oakland; Gary O. Klinger, Warren, all of Mich.

[73] Assignee: ITT Automotive, Inc., Auburn Hills, Mich.

[21] Appl. No.: 08/770,662

[22] Filed: Dec. 20, 1996

[51] Int. Cl.⁶ ................................... F16L 39/00
[52] U.S. Cl. .................... 285/319; 285/423; 285/921
[58] Field of Search ................... 285/319, 921, 285/423

[56] References Cited

U.S. PATENT DOCUMENTS

| | | |
|---|---|---|
| 116,655 | 7/1871 | Westinghouse . |
| 820,774 | 5/1906 | Flyberg . |
| 921,691 | 5/1909 | Friday . |
| 940,678 | 11/1909 | Doane et al. . |
| 951,889 | 3/1910 | Teuer . |
| 2,550,591 | 4/1951 | Parsons ................................. 285/319 |
| 3,202,442 | 8/1965 | Abbey et al. . |
| 3,394,954 | 7/1968 | Sarns . |
| 3,455,579 | 7/1969 | Olliff et al. . |
| 3,569,903 | 3/1971 | Brishka . |
| 3,588,149 | 6/1971 | Demler . |
| 4,123,091 | 10/1978 | Cosentino et al. . |
| 4,451,069 | 5/1984 | Melone . |
| 4,471,978 | 9/1984 | Kramer . |
| 4,577,894 | 3/1986 | Wake . |
| 4,673,200 | 6/1987 | Miyauchi . |
| 4,790,569 | 12/1988 | Chaffee . |
| 4,793,639 | 12/1988 | Glover et al. ........................ 285/921 X |
| 4,826,477 | 5/1989 | Adams . |
| 4,969,879 | 11/1990 | Lichte ................................ 285/319 K |
| 5,082,315 | 1/1992 | Sauer . |
| 5,120,085 | 6/1992 | Shin .................................... 285/921 X |
| 5,123,677 | 6/1992 | Kreczko et al. .................... 285/921 X |
| 5,297,819 | 3/1994 | Harder ................................ 285/921 X |
| 5,374,088 | 12/1994 | Moretti et al. . |
| 5,462,313 | 10/1995 | Rea et al. . |
| 5,511,827 | 4/1996 | Steinkamp et al. . |
| 5,568,948 | 10/1996 | Bartholomew . |
| 5,573,279 | 11/1996 | Rea et al. . |
| 5,711,553 | 1/1998 | Bonser ................................... 285/319 |

FOREIGN PATENT DOCUMENTS 568075   11/1993   European Pat. Off. ............... 285/319

*Primary Examiner*—Dave W. Arola
*Attorney, Agent, or Firm*—Robert P. Seitter

[57] ABSTRACT

A quick connector releasibly connects first and second conduits fixedly mounted in first and second, interconnectable connector bodies. The first body has an axially extending tubular first end, a frusto-conical portion, a reduced diameter shaft and an enlarged second end. A pair of angularly inwardly extending latch arms project from the second body to releasibly engage a peripheral edge on the frusto-conical portion of the first body.

8 Claims, 2 Drawing Sheets

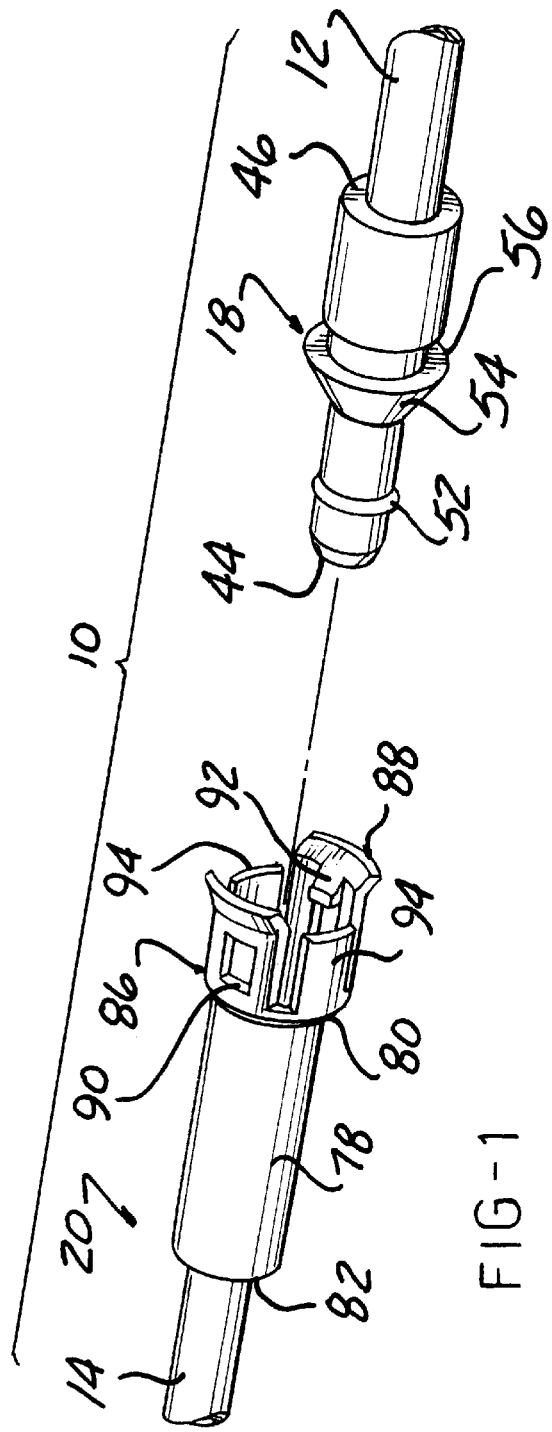
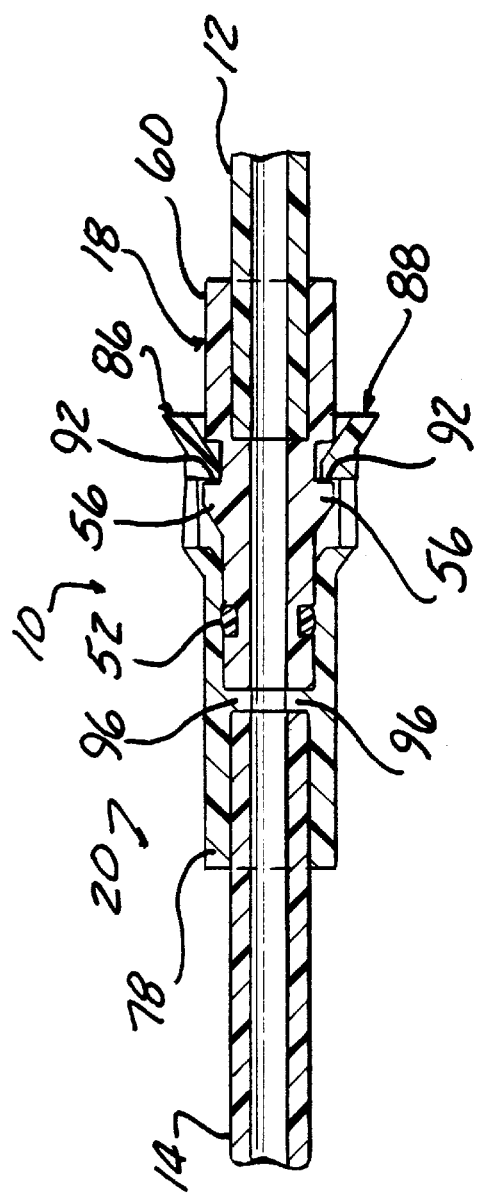

INLINE QUICK CONNECTOR

BACKGROUND OF THE INVENTION

1. Field of the Invention

The present invention relates, in general, to fluid connections or couplings, and more specifically, to quick connector type fluid couplings.

2. Description of the Art

A variety of connectors and connection devices are used to interconnect two fluid carrying conduits, tubes or hoses.

A simple connector makes use of a double ended male plug having a through bore extending therethrough. The plug is forcibly urged into the end of one conduit and receives the end of another conduit at an opposite end. However, problems with obtaining a secure sealed attachment of the connector to each conduit as well as providing sufficient axial pull off resistance to prevent separation of either conduit from the connector has led to the development of quick connectors in which the connector is formed of two separable components, with each component fixedly and sealingly attached to a conduit. The two connector components are urged into interconnecting engagement to provide a sealed, fluid flow path between the two conduits.

In one such connector, a male component has a cylindrical end portion carrying an O-ring which is snugly received within a correspondingly sized bore in a female component. Diametrically opposed pawls are formed at one end of the female component for releasably engaging an enlarged frusto-conical shaped portion on the male component to fixedly interconnect the male and female components when the male component is inserted into the female component. Angularly outward extending lugs are formed on the end of the female component and provide release surfaces to disenable the pawls from the frusto-conical portion of the male component so as to enable separation of the male and female components.

While the above-described two part quick connector is effective in providing a sealed fluid coupling between two conduits, it is intended for use with fluid conduits used in an adjustable lumbar support having an inflatable air bag mounted in a seat back portion of an automotive seat. The fluid pressures are in the order of approximately 8 psi which does not create significant problems with respect to pull off or separation of the two connector components.

Thus, it would be desirable to provide a quick connector for fluid conduits which can be advantageously employed with fluid conduits carrying high fluid pressure. It would also be desirable to provide such a quick connector which has a low insertion force while still providing high pull out resistance.

SUMMARY OF THE INVENTION

The present invention is a quick connector for sealingly coupling first and second fluid conduits. The present quick connector includes first and second releasably interconnectable bodies. The first body has a axially extending through bore extending between opposed first and second ends. A frusto-conical portion is formed intermediately between the first end and second ends of the first body. A reduced diameter shafts extends from one end of the frusto-conical portion to an enlarged cylindrical end portion having an internal bore sized to receive one end of the first conduit. The first conduit is fixed in the bore in the cylindrical portion of the first body, preferably by solvent bonding.

The quick connector also includes a second body having a through bore extending through a cylindrical portion. The second conduit is fixedly mounted in the through bore of the second body, also preferably by solvent bonding. A pair of axially extending latch arms project from one end of the cylindrical portion of the second body. The latch arms extend angularly inward from a proximal end coupled to the second body to a digital end freely movable with respect to a longitudinal axis of the second body. Inwardly extending projections are formed on each of the latch arms and releasibly engage a peripheral edge on the frusto-conical portion of the first body when the first and second bodies are coupled together. A pair of guide members are circumferencially interposed between the first and second latch arms on the one end of the second body.

The quick connector of the present invention provides a sealed coupling between two conduits carrying high pressure fluid. The quick connector has a low insertion force and high pull out resistance.

BRIEF DESCRIPTION OF THE DRAWINGS

The various features, advantages and other uses of the present invention will become more apparent by referring to the following detailed description and drawing in which:

FIG. 1 is an exploded, prospective view of the two bodies forming the quick connector of the present invention;

FIG. 3 is a longitudinal cross sectional view showing the interconnected components of the quick connector depicted in FIGS. 1 and 2.

DESCRIPTION OF THE PREFERRED EMBODIMENT

Figure 2:
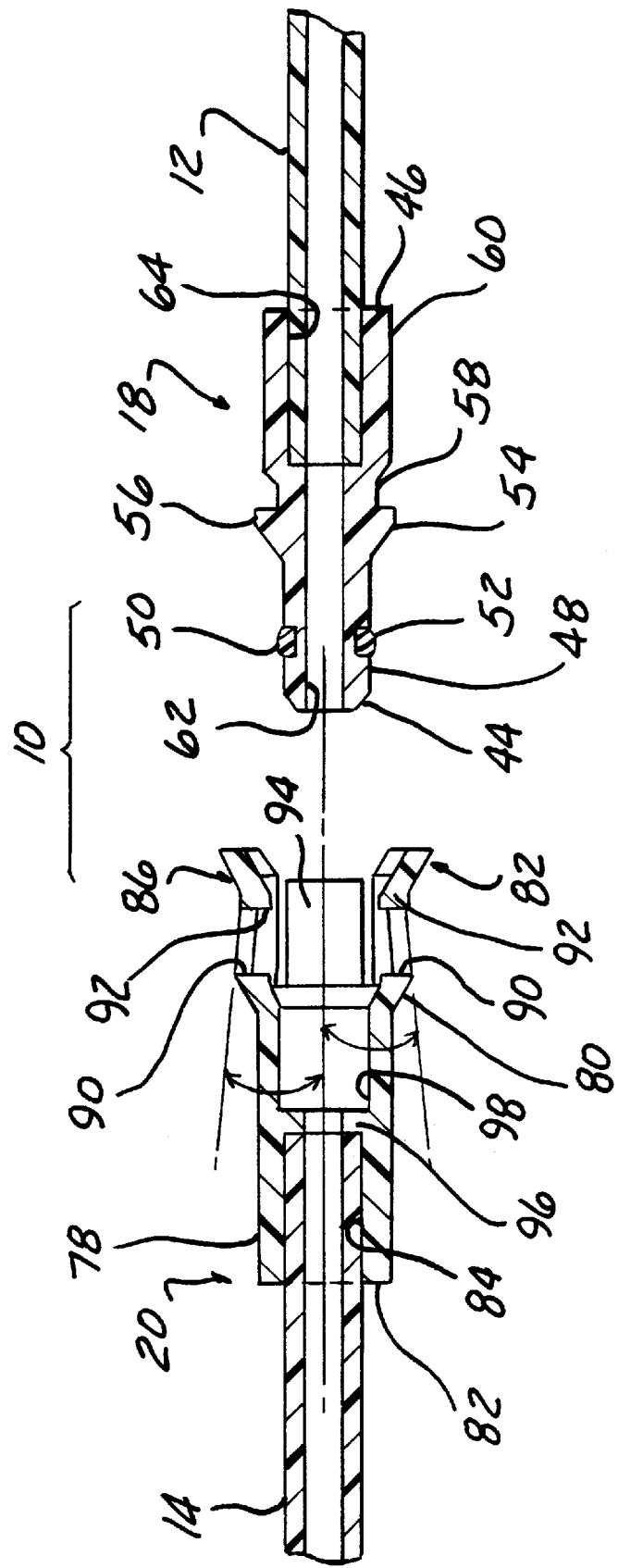
FIG. 2 is a longitudinal exploded, cross sectional view of the quick connector shown in FIG. 1.

Referring no to FIGS. 1–3 there is depicted a quick connector 10 suitable for sealingly coupling and disposing first and second conduits 12 and 14 in fluid flow communication.

The quick connector 10 is formed first and second releasibly interconnectable bodies 18 and 20. The first body 18 is formed of a suitable high strength plastic material, such as Nylon 6. The first body 18 has opposed first and second ends 44 and 46, respectively. A generally cylindrical, tubular portion 48 extends from the first end 44 and includes an annular recess 50 sized to receive a seal means, such an O-ring 52, as shown in FIGS. 103.

The frusto-conical portion 54 terminates in a peripheral outer edge at one end. A reduced diameter cylindrical shaft 58 extends from one end of the frusto-conical portion 54 to an enlarged diameter cylindrical end portion 60 which terminates at the second end 46 of the first body 18.

A through bore 62 extends through the tubular cylindrical portion 48, the frusto-conical portion 54 and the shaft 58 and is disposed in communication with an enlarged diameter bore 64 formed in the cylindrical end portion 60. The enlarged bore 64 is sized to snugly receive one end of the first conduit 12. As described, the first conduit 12 is fixedly mounted in the bore 64 in the cylindrical end portion 60 by suitable means. By example, the preferred securing means is solvent bonding of the conduit 12 to the inner surface of the bore 64 in the first body 18.

The second body 20 is also formed of a suitable high strength plastic material, such as Nylon 6. The second body 20 includes a generally cylindrical portion 78 with opposed first and second ends 80 and 82, respectively. By example only, the cylindrical portion 78 is shown as having a linear shape. It will be understood that the cylindrical portion 78 of the second body 20 may also have other shapes, such as a 90° elbow, a Tee with two outlets, etc.

A bore 84 is formed in the cylindrical portion 78 and extends axially inward from the second end 82 of the second body 20. The bore 84 is sized to snugly receive one end of the second conduit 14. Suitable securing or mounting means, such as solvent bonding in a preferred example, is used to fixedly mount the conduit 14 in the bore 84 of the second body 20. A pair of latch arms 86 and 88 project axially from the first end 80 of the cylindrical portion 78. The latch arms 86 and 88 are diametrically opposed and have a generally concave shape to define a portion of an annular bore sized to securely receive the frusto-conical portion 54 of the first body 18. A receiver means 90, such as an aperture, is formed in each latch arm 86 and 88. An inwardly extending projection 92 is formed in each latch arm 86 and 88 adjacent one edge of the aperture 90. The projections 92 are positioned to snap around and engage the peripheral edge on the frusto-conical portion 54 on the first body 18 to releasably interconnect the first and second bodies 18 and 20.

As shown in FIG. 2, the first and second latch arms 86 and 88 extend angularly inward at acute angles by the arrows in FIG. 2, with respect to longitudinal axis of the second body 20. This creates a high spring force on the latch arms 86 and 88 which increases the pull out resistance or force required to separate the first body 18 from the second body 20.

A pair of guide members 94 are disposed diametrically opposite each other and between the latch arms 86 and 88. The guide members 94 also have a generally concave shape.

An annular shoulder 96 is formed in the second body 20 intermediate the first and second ends 80 and 82 as shown in FIGS. 2 and 3. The shoulder 96 acts as a stop to limit the insertion distance of the second conduit 14 into the bore 84. The shoulder 96 also acts as a stop for insertion of the first body 18 into an enlarged bore 98 extending inward from the first end 80 of the second body 20. The bore 98 is sized to snugly receive the tubular cylindrical portion 48 of the first body 18 as shown in FIG. 3.

In use, the first and second bodies 18 and 20 are forcibly urged together causing the insertion of the tubular cylindrical portion 48 of the first body between the latch arms 86 and 88 and into the bore 98. The O-ring 52 compresses by engagement with the surface forming the bore 98 to bring adjacent portions of the tubular cylindrical portion 48 of the first body into contact with the adjacent surface forming the bore 98 in the second body 20. This engagement acts as a bearing surface preventing sideways movement of the first body relative to the second body 20.

During insertion of the first body 18 into the second body 20, the outer or distal ends of the latch arms 86 and 88 will contact and ride outward along the surface of the frusto-conical portion 54 of the first body until the projections 92 on the latch arms 86 and 88 snap over and engage the outer peripheral edge 56 on the first body 20 to securely interconnect the first and second bodies 18 and 20. In this assembled position, shown in FIG. 3, the outer peripheral edge 56 and an adjacent portion of the frusto-conical portion 54 of the first body 20 extend outward through the apertures 90 in the latch arms 86 and 88.

To separate the first and second bodies 18 and 20, the latch arms 96 and 98 are urged radially outward by manual force or by a release tool to disengage the projections 92 from the peripheral edge 56 on the first body 18.

In summary, there has been disclosed a quick connected suited for interconnecting two pressurized fluid conduits. The quick connector is designed to provide increased pull out resistance preventing separation of the joined components of the quick connector.

What is claimed is:

1. A connector for sealingly coupling first and second fluid conduits, connector comprising:

a first connector body having a through bore extending between opposed first and second ends, the bore disposed in fluid communication with the first conduit;

an enlarged portion formed intermediately on the first body and having a peripheral edge;

a second body having opposed first and second ends;

the second body having a bore extending between first and second ends, the bore disposed in fluid flow communication with the second conduit at one end;

first and second latch arms each having proximal and distal ends, each proximal end coupled against relative axial movement to the first end of the second body, each distal end freely movable with respect to the second body;

the proximal end of each first and second latch arm disposed radially outward from the distal end with respect to a longitudinal axis through the second body; and the first and second latch arms expandable radially outward and engageable with the peripheral edge of the enlarged portion of the first body as the first body is disposed in the bore in the second body, the distal ends of the first and second latch arms biased radially inward toward the first body to join the first and second bodies.

2. The connector of claim 1 further comprising:

a projection extending angularly outward from each of the distal ends of the first and second latch arms with respect to a longitudinal axis through the second body.

3. The connector of claim 1 wherein the first and second conduits are solvent bonded in the first and second bodies, respectively.

4. The connector of claim 1 wherein the second body further comprises:

an intermediate, annular extending shoulder formed in the bore in the second body, the shoulder limiting insertion of the second conduit into the second body and limiting insertion of the first body into the second body.

5. The connector of claim 1 further comprising:

a reduced diameter shaft extending axially from the enlarged portion of the first body;

an enlarged end portion extending axially from the reduced diameter shaft of the first body.

6. A connector for sealingly coupling first and second fluid conduits, connector comprising:

a first connector body having a through bore extending between opposed first and second ends, the bore disposed in fluid flow communication with the first conduit at the second end of the first body;

an enlarged portion formed intermediately on the first body and having a peripheral edge;

a second body having opposed first and second ends;

the second body having a bore extending between first and second ends, the bore disposed in fluid flow communication with the second conduit at one end;

first and second latch arms each having proximal and distal ends, each proximal end coupled against relative axial movement to the first end of the second body, each distal end freely movable with respect to the second body;

the proximal end of each first and second latch arm disposed radially outward from the distal end with respect to a longitudinal axis through the second body; and the first and second latch arms expandable radially outward and engageable with the peripheral edge of the enlarged portion of the first body as the first body is disposed in the bore in the second body, the distal ends of the first and second latch arms biased radially inward toward the first body to join the first and second bodies.

7. A connector for sealingly coupling first and second conduits, connector comprising:

a first connector body having a through bore extending between opposed first and second ends, the bore disposed in fluid flow communication with the first conduit at the second end of the first body;

an enlarged portion formed intermediately on the first body and having a peripheral edge;

a second body having opposed first and second ends;

the second body having a bore extending between first and second ends, the bore disposed in fluid flow communication with the second conduit at one end;

first and second latch arms each having proximal and distal ends, each proximal end coupled against relative axial movement to the first end of the second body, each distal end freely movable with respect to the second body;

the proximal end of each first and second latch arm disposed radially outward from the distal end with respect to a longitudinal axis through the second body; and an aperture formed in each of the first and second latch arms for releasably receiving the peripheral edge of the enlarged portion of the first body as the first body is disposed in the bore in the second body, the distal ends of the first and second latch arms biased radially inward toward the first body to join the first and second bodies.

8. The connector of claim 7 wherein the first and second latch arms are integrally formed as a one-piece part of the second body.

* * * * *